Sept. 29, 1970 TOSHIHIRO HOSHI ET AL 3,531,781

THIN FILM MATRIX MEMORY SYSTEM

Filed Jan. 21, 1965 2 Sheets-Sheet 1

PRIOR ART

United States Patent Office 3,531,781
Patented Sept. 29, 1970

3,531,781
THIN FILM MATRIX MEMORY SYSTEM

Toshihiro Hoshi and Akio Izumi, Kawasaki-shi, and Sukeyoshi Sakai, Tokyo, Japan, assignors to Fujitsu Limited, Kawasaki, Japan, a corporation of Japan Filed Jan. 21, 1965, Ser. No. 427,188
Claims priority, application Japan, Jan. 22, 1964, 39/2,812
Int. Cl. G11c *11/14*
U.S. Cl. 340—174 16 Claims

ABSTRACT OF THE DISCLOSURE

A matrix memory system includes a plurality of parallel spaced electrical conductors each formed in a uniplanar geometric pattern. A plurality of parallel spaced independent linear electrical conductors are positioned in operative proximity with the electrical conductors in a plane perpendicular to that of the electrical conductors, each of the plurality of linear conductors having a ferromagnetic thin film thereon. The linear conductors are positioned in a matrix form in rows and columns and the electrical conductors are positioned in a manner whereby a magnetic field produced by a current in an electrical conductor and a magnetic field produced by a current in the linear conductors are substantiallly perpendicular to each other. Each of the electrical conductors is rectilinearly positioned in the spaces between the linear conductors of a group in a plane and provides a magnetic flux to the linear conductors on both sides thereof.

The present invention relates to a matrix memory system. More particularly, the invention relates to a matrix memory system utilizing ferromagnetic thin films.

Ferromagnetic thin films are utilized in high speed electronic computers since they considerably shorten the time for read-in and read-out. The time required to change the contents or data or information of the memory system is known as the switching time. The switching time of a ferromagnetic thin film system is less than $10^{-7}$ seconds. When information or data is read in or read out in such a short time, the time during which the data is transmitted must be kept short compared with the read-in and read-out time. It therefore is necessary that the memory equipment be made as small and as compact as possible.

The principal object of the present invention is to provide a new and improved matrix memory system.

An object of the present invention is to provide a matrix memory system which is small and compact in size.

In accordance with the present invention, a matrix memory system comprises a plurality of substantially parallel spaced electrical conductors each formed in a uniplanar geometric pattern and a plurality of substantially parallel spaced independent groups of substantially linear electrical conductors, each of the groups comprising a plurality of substantially parallel spaced independent substantially linear electrical conductors positioned in operataive proximity with the pattern-formed electrical conductors in a plane perpendicular to those of the pattern-formed electrical conductors, each of the plurality of eletcrical conductors having a ferromagnetic thin film thereon.

The memory elemetns of the matrix memory system of the present invention are ferromagnetic thin films with uniaxial magnetic anistropy grown on a thin electrically conductive wire by any suitable method such as, for example, electrodeposition. The treated wire is called thin film wire.

If a first magnetization axis is parallel to the circumferential direction of a thin film wire, read-in of data to the memory system causes magnetization reversal only when a proper magnetic field is applied in each of the directions parallel to the first magnetization axis, and simultaneously to a second magnetization axis, perpendicular to the first magnetization axis. Magnetization reversal does not occur when a magnetic field is applied in a direction of only one of the first and second magnetization axes.

A magnetic field may be provided in a first direction of magnetisim by feeding current through the thin film wire. The current fed through the thin film wire may be called the digit current. The second direction of magnetizaion is in the direction of the axis of the thin film wire, so that a magnetic field in the second direction of magnetization is provided by feeding current through a wire independent of the thin film wire. The current fed through the independent wire may be called the word current. The independent wire may be called the word wire.

In order that the present invention may be readily carried into effect, it will now be described with reference to the accompanying drawings, wherein.

The number of turns of the word wire depends upon various factors. In general, a lesser number of turns of the word wire is desirable as far as the provision of a suitable and sufficient magnetic field is concerned. In most cases, the word wire is wound in single turns.

Figure 1:
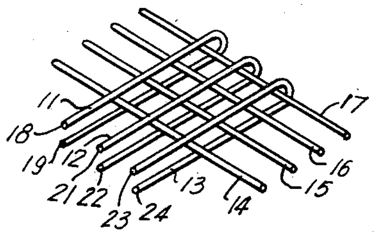
FIG. 1 is a perspective view of an embodiment of a thin film matrix memory system of the prior art.

In FIG. 1, a plurality of copper wires 11, 12 and 13 are each bent in substantially U-type configuration and a plurality of thin film wires 14, 15, 16 and 17 are positioned in spaced parallel relation to each other in a single plane passing through the loops formed by the wires 11, 12 and 13. Each of the wires 11, 12 and 13 of the prior art system of FIG. 1 functions as a single turn word wire.

The word wire 11 has two end terminals 18 and 19, the word wire 12 has two end terminals 21 and 22, and the word wire 13 has two end terminals 23 and 24. If the terminals 18 and 22 and the terminals 21 and 24 of the word wires are connected together and the terminals 19 and 23 are made the terminals for the whole, the word wires function as a three turn word wire.

If the word wires are placed close together, the magnetic field is intensified. Each part of a thin film wire surrounded by a word wire is a memory element of one bit. If four thin film wires are utilized, as in FIG. 1, four bits of data are produced. If the word wires of the system of FIG. 1 are not connected to each other and if they are used as individual word wires, twelve bits of data are produced.

The matrix memory system of the present invention is preferable for three turn wiring, as opposed to winding the word wire three times or turns around each of the thin film wires as in the prior art system, because it avoids winding many turns and it permits the close positioning of the thin film wires. Furthermore, another advantage of the matrix memory system of the present invention is that the word wires may be positioned at precisely right angles with the second magnetization axis. In the prior art system of winding the word wire three times or turns around each of the thin film wires, it is difficult to position the word wires at precisely right angles with the second magnetization axis and it is accordingly difficult to provide a magnetic field parallel to said second magnetization axis.

In the matrix memory system of the present invention, the thin film wires and the word wires are positioned in three-dimensional arrangement with each other to provide a closely spaced compact system.

Figure 2:
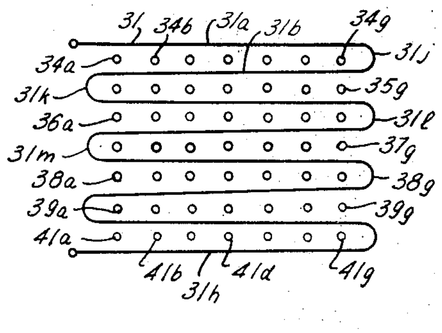
FIG. 2 is a side view of an embodiment of a thin film matrix memory system of the present invention.
Figure 3:
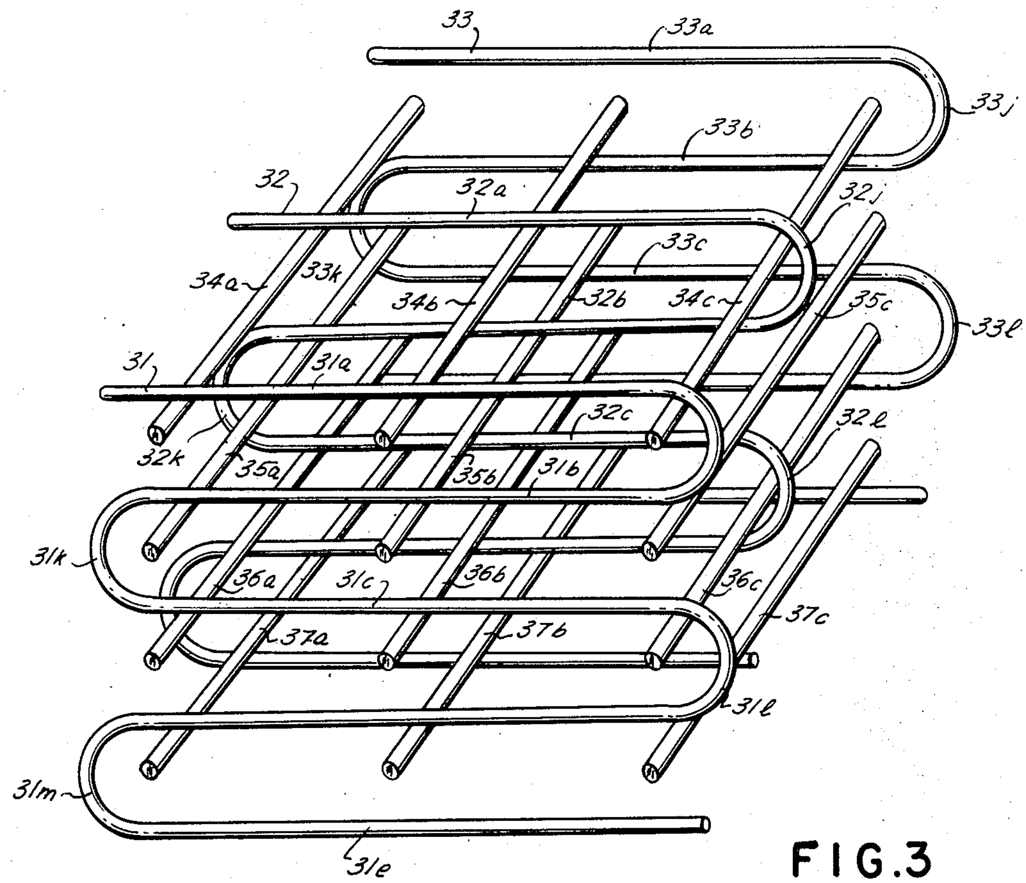
FIG. 3 is a perspetcive view of a portion of the embodiment of FIG. 2.

In FIGS. 2 and 3, a plurality of parallel spaced electrical conductors or word wires 31, 32 and 33 each is formed in a uniplanar geometric pattern in which the conductor or word wire is folded over upon itself in opposite directions to provide a plurality of parallel spaced linear portions 31*a*, 31*b*, 31*c*, etc., 32*a*, 32*b*, 32*c*, etc. and 33*a*, 33*b* and 33*c*, etc. joined at their opposite ends 31*j*, 31*k*, 31*l*, 31*m*, etc., 32*j*, 32*k*, 32*l*, 32*m*, etc. and 33*j*, 33*k*, 33*l*, 33*m*, etc. to the next adjacent linear portions.

A plurality of parallel spaced independent groups of linear electrical conductors or thin film wires 34, 35, 36, 37, 38, 39 and 41 each comprises a plurality of parallel spaced independent linear electrical conductors or thin film wires 34*a*, 34*b*, 34*c*, etc., 35*a*, 35*b*, 35*c*, etc., 36*a*, 36*b*, 36*c*, etc., 37*a*, 37*b*, 37*c*, etc., 38*a*, 38*b*, 38*c*, etc., 39*a*, 39*b*, 39*c*, etc. and 41*a*, 41*b*, 41*c*, etc., positioned in operative proximity with the pattern-formed electrical conductors or word wires 31, 32 and 33 in a plane perpendicular to those of the word wires 31, 32 and 33 and between corresponding adjacent parallel portions 31*a* and 31*b*, 31*b* and 31*c*, 32*a* and 32*b*, 32*b*, and 32*c*, 33*a* and 33*b*, 33*b* and 33*c*, etc. of the word wires. Each of the plurality of electrical conductors 34, 35, 36, 37, 38, 39 and 41 is covered with a ferromagnetic thin film.

There may, of course, be any suitable number of word wires, having any suitable number of linear portions, and there may be any suitable number of groups of thin film wires, each having any suitable number of thin film wires. If desired, selected ones of the word wires may be connected to each other.

Each linear portion of each of the word wires except the extreme top and bottom linear portions such, as for example, 31*a* and 31*b* of FIG. 2, provides a magnetic field for the thin film wires next adjacent to and on each side of it. Thus in the embodiment of FIG. 2, a shorter length of word wire than each of the word wires of FIG. 1 may be utilized and the thin film wires may be positioned close together and compactly.

Furthermore, in the embodiment of FIG. 2, the magnetic field in the space between parallel adjacent linear portions of a word wire is in a direction opposite to the magnetic field in the next adjacent space, so that most of the magnetic flux is in a closed magnetic circuit and very little leakage flux occurs in adjacent wires. Thus, the thin film wires in the next adjacent group of thin film wires are not subjected to disturbances. This is an important consideration in positioning the components of the matrix memory system in close, compact relation to each other.

Figure 4:
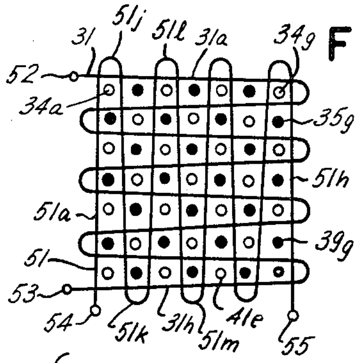
FIG. 4 is a side view of a modification of the embodiment of FIG. 2.

In FIG. 4, in addition to the word wires 31, 32 and 33 and the groups of thin film wires 34, 35, 36, 37, 38, 39 and 41 of the embodiment of FIG. 2, a plurality of parallel spaced second electrical conductors or word wires 51, etc. are provided. Each of the second electrical conductors or word wires 51 etc., of which any suitable number may be utilized, is formed in a uniplanar geometric pattern parallel and adjacent to a corresponding one of the first word wires 31, 32 and 33 in which the second conductor or word wire is folded over upon itself in opposite directions perpendicular to the first word wires 31, 32 and 33 to provide a second plurality of parallel spaced linear portions 51*a*, 51*b*, 51*c*, etc. perpendicular to the linear portions 31*a*, 31*b*, etc., 32*a*, 32*b*, etc. and 33*a*, 33*b*, etc. of the first word wires 31, 32 and 33 and joined at their opposite ends 51*j*, 51*k*, 51*l*, etc to the next adjacent linear portions.

The thin film wires of the plurality of parallel spaced independent groups of linear electrical conductors or thin film wires 34, 35, 36, 37, 38, 39 and 41 are positioned in operative proximity with the word wires 31, 32, 33 and 51 in a plane perpendicular to those of the first and second word wires 31, 32, 33 and 51 and between corresponding adjacent parallel portions 31*a* and 31*b*, 51*a* and 51*b*, 31*b* and 31*c*, 51*b* and 51*c*, etc., of the word wires.

In the modification of FIG. 4 the word wires are positioned with their linear portions at right angles to each other. The first word wire 31 may be provided with end terminals 52 and 53 and the second word wire 51 may be provided with end terminals 54 and 55. If the terminal 53 of the first word wire 31 is connected to the terminal 54 of the second word wire 51, each part of the thin film wires surrounded by adjacent linear portions of each of the first and second word wires constitutes one bit. Each bit is surrounded on four sides by word wires, so that a magnetic field applied to each bit due to a current flow through the surrounding the word wires is considerably more effective than in the embodiment of FIG. 2.

In the solid marked ones of the thin film wires of the modification of FIG. 4, there is no magnetic field because the magnetic field provided by the first word wire 31 is counteracted by the magnetic field provided by the second word wire 51 due to the opposite directions of such magnetic fields. The only effective thin film wires are thus those marked with open circles, as in FIG. 2.

Accordingly, the number of closely positioned thin film wires which may be utilized in the embodiment of FIG. 4 is less than those which may be utilized in the embodiment of FIG. 2. However, if, in the embodiment of FIG. 2, the thin film wires of one group in one plane between adjacent linear portions of the surrounding word wire were positioned so closely as to be in contact with each other, the resultant effect would be undesirable, since adjacent thin film wires influence each other. It is thus necessary to space the thin film wires of each group from each other and the groups of thin film wires from each other, so that the modification of FIG. 4 is satisfactory.

The modification of FIG. 4 may be provided with greater mechanical strength than the embodiment of FIG. 2. This may be achieved by utilizing mechanically strong wires instead of those marked by solid dots or circles, which are ineffective as thin film wires. The mechanically strong wires prevent the thin film wires from distortion such as, for example, bending. The word wires may be wound as cross strips so that they hold the thin film wires tightly in position. Each open circle marked thin film wire of the modification of FIG. 4 is provided with a magnetic field in a direction opposite to that of its next adjacent thin film wire represented by an open circle.

Figure 5:
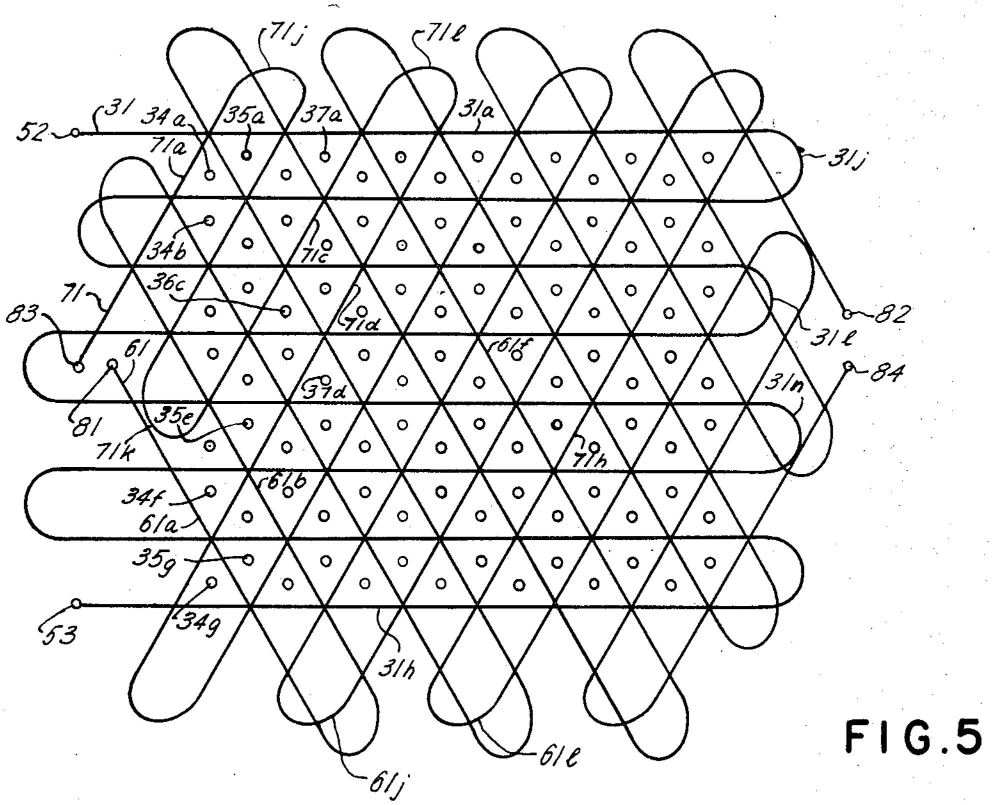
FIG. 5 is a side view of another modification of the embodiment of FIG. 2.

In FIG. 5, in addition to the word wires 31, 32 and 33 and the groups of thin film wires 34, 35, 36, 37, 38, 39, 40, 41, 42, 43, 44, 45, 46 and 47 similar to the embodiment of FIG. 2 and to the modification of FIG. 4, a plurality of second conductors or word wires 61, etc. and a plurality of third conductors or word wires 71, etc. is provided.

In FIG. 5, a plurality of parallel spaced second electrical conductors or word wires 61, etc. is provided. Each of the plurality of second conductors 61, etc. is formed in a uniplanar geometric pattern parallel and adjacent to a corresponding one of the first word wires 31, etc. in which the second conductor or word wire is folded over upon itself in opposite directions transverse to the first word wires to provide a second plurality of parallel spaced linear portions 61*a*, 61*b*, etc. at angles of 60 degrees with the linear portions of the first word wires and joined at their opposite ends 61*j*, 61*k*, etc. to the next adjacent linear portions.

A plurality of parallel spaced third electrical conductors or word wires 71, etc. is provided. Each of the plurality of third conductors 71, etc. is formed in a uniplanar geometric pattern parallel and adjacent to a corresponding one of the first word wires 31, etc. and to a corresponding one of the second word wires 61, etc. in which the third conductor or word wire is folded over upon itself in opposite directions transverse to the first and second word wires to provide a third plurality of spaced linear portions 71*a*, 71*b*, 71*c*, etc. at angles of 60 degrees with the linear portions of the first word wires and at angles of 60 degrees with the linear portions of the second word wires to form equilateral triangles with the first and second word wires and joined at their opposite ends 71*j*, 71*k*, 71*l*, 71*m*, etc. to the next adjacent linear portions. The thin film wires are positioned in operative proximity with the word wires 31, etc., 61, etc. and 71, etc. in planes perpendicular to the planes of the first, second and third word wires 31, etc., 61, etc. and 71, etc. and in the spaces formed by the equilateral triangles.

The terminals of the first word wire 31 are 52 and 53, the terminals of the second word wire 61 are 81 and 82 and the terminals of the third word wire 71 are 83 and 84. Current supplied to the first word wire 31 flows from the terminal 53 to the terminal 52, current supplied to the second word wire 61 flows from the terminal 81 to the terminal 82 and current supplied to the third word wire 71 flows from the terminal 83 to the terminal 84.

In the modification of FIG. 5, as in the embodiment of FIG. 2 and as in the modification of FIG. 4, any suitable number of word wires, having any suitable number of linear portions, and any suitable number of groups of thin film wires, each having any suitable number of thin film wires, may be utilized. Furthermore, selected ones of the word wires may be connected to each other.

Figure 6:
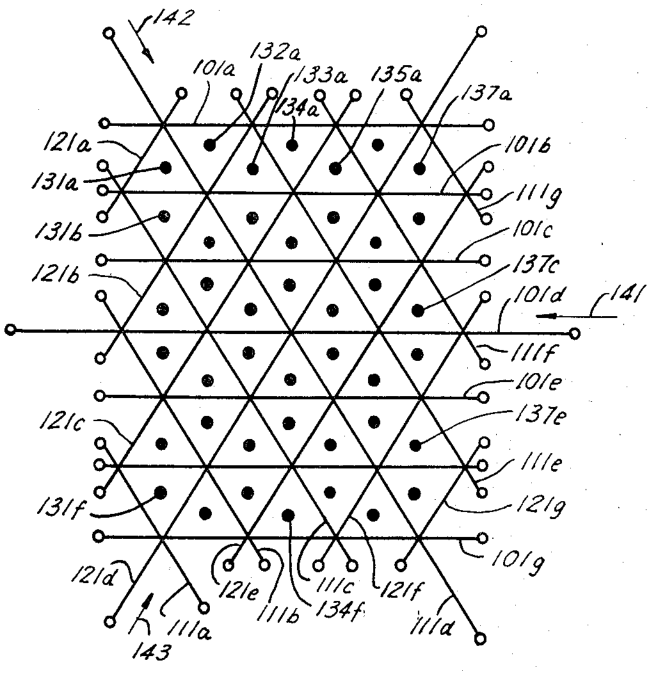
FIG. 6 is a side view of a modification of the embodiment of FIG. 5.

The embodiment of FIG. 6 is a modification of the one shown in FIG. 5 in which the linear portions of the word wires are not connected at their opposite ends, but are left disconnected, to form independent linear word wires. In FIG. 6, a first plurality of independent groups of electrical conductors or word wires 101, etc. each comprises a first plurality of parallel spaced independent linear electrical conductors or word wires 101*a*, 101*b*, 101*c*, 101*d*, 101*e*, 101*f*, 101*g*, etc. in a first plane. The first planes of the first groups of conductors or word wires are parallel to and spaced from each other.

A second plurality of independent groups of electrical conductors or word wires 11, etc. each comprises a second plurality of parallel spaced independent linear electrical conductors or word wires 111*a*, 111*b*, 111*c*, 111*d*, 111*e*, etc. in a second plane adjacent to a corresponding one of the first planes and positioned at an angle of 60 degrees with the first word wires. The second planes of the second groups of word wires are parallel to and spaced from each other.

A third plurality of independent groups of electrical conductors or word wires 121, etc. each comprises a third plurality of parallel spaced independent linear electrical conductors or word wires 121*a*, 121*b*, 121*c*, 121*d*, 121*e*, etc. in a third plane adjacent to a corresponding one of each of the first and second planes and positioned at an angle of 60 degrees with the first and second word wires to form equilateral triangles with the first and second word wires. The third planes of the third groups of word wires are parallel to and spaced from each other.

In the figures, the word wires not shown are positioned in planes parallel to the plane of the sheet of the drawing and spaced from each other; the thin film wires extending perpendicularly to the plane of the sheet of the drawing.

A plurality of parallel spaced independent groups of linear electrical conductors or thin film wires 131, 132, 133, 134, 135, 136 and 137 each comprises a plurality of parallel spaced independent linear electrical conductors or thin film wires 131*a*, 131*b*, 131*c*, 131*d*, etc., 132*a*, 132*b*, 132*c*, 132*d*, etc., 133*a*, 33*b*, 133*c*, 133*d*, etc. 134*a*, 134*b*, 134*c*, 134*d*, etc., 135*a*, 135*b*, 135*c*, 135*d*, etc., 136*a*, 136*b*, 136*c*, 136*d*, etc. and 137*a*, 137*b*, 137*c*, 137*d*, etc. positioned in operative proximity with the word wires in corresponding ones of the triangles and in a plane perpendicular to those of the first, second and third word wires. Each of the thin film wires has a ferromagnttic thin film on it.

Figure 7:
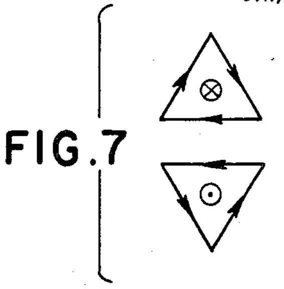
FIG. 7 is a schematic representation of current flow in the modification of FIG. 6.

In FIGS. 5 and 6, the thin film wires are preferably positioned at the geometrical center of the corresponding triangles formed by the first, second and third word wires. Current supplied to the first word wires 101 flows in the direction of an arrow 141 from right to left, current supplied to the second word wires 111 flows in the direction of an arrow 142 from the upper left to the lower right, and current supplied to the third word wires 121 flows in the direction of the arrow 143 from the lower left to the upper right. In each of FIGS. 5 and 6, as shown in FIG. 7, current flows in a clockwise direction around the upright triangles and current flows in a counterclockwise direction around the inverted triangles. The magnetic flux in the triangles is in closed magnentic circuits.

In the modifications of FIGS. 5 and 6, all the thin film wires may be utilized, so that such thin film wires may be positioned closer and more compactly than in the modification of FIG. 4. Furthermore, the magnetic fields may be applied to the thin film wires more effectively in the modifications of FIGS. 5 and 6 than in the embodiment of FIG. 2.

The areas for one bit at the surface of a thin film wire parallel to a word wire are, when the thin film wires are to be positioned most closely and most compactly, computed as follows. In the embodiment of FIG. 2, the areas are equal to $(a)(a+b)$. In the modification of FIG. 4, the areas are equal to $(2)\ (a+b)^2$. In the modifications of FIGS. 5 and 6, the areas are equal to $(3\sqrt{3}/4)(a+b)^2$. The diameter of each thin film wire is represented by "$a$" and the diameter of each word wire is represented by "$b$." The areas for one bit at the surface of a thin film wire are thus greatest in the modification of FIG. 4 and least in the embodiment of FIG. 2.

The matrix memory system of the present invention may be manufactured with facility. The word wires are made, for example, by winding electrically conductive wire on a jig comprising a plurality of interwound straight steel wires. As many layers of word wires are positioned on the jig, which is then removed and replaced by the thin film wires.

If there is insufficient space between adjacent groups of coplanar thin film wires, parts of such wires may interact with each other. If this occurs, intermediate word wires may be utilized merely as spacerss. If such interaction may be overlooked, the word wires may also be positioned adjacent each other, so that the area for each bit on a thin film wire is equivalent to once, twice and thrice the diameter of the word wire in the embodiment of FIG. 2, the modification of FIG. 4 and the modifications of FIGS. 5 and 6, respectively. The bit density along a thin film wire is the greatest in the embodiment of FIG. 2 and the least in the modifications of FIGS. 5 and 6. It is thus seen that each of the emobdiment of FIG. 2, the modification of FIG. 4 and the modifications of FIGS. 5 and 6 has its advantages and its disadvantages, so that each is utilized in accordance with the specific problem at hand and its circumstances.

The layers of coplanarly positioned word wires and thin film wires of the matrix memory system of the present invention may be fastened together to maintain their relative positions. The word wires may be fastened together in any suitable manner such as, for example, by thin wires or threads extending in the direction of the thin film wires.

The operation of the matrix memory system of the present invention involves the supply of a read-in current to the word wire to change the magnetization of the thin film wire and thereby record a bit of information and/or the supply of a read-out current to the word wire to detect a change in magnetization of the thin film wire and provide a read-out of the bit of information. The operation of the system for read-in and read-out is the usual operation of core matrix systems.

While the invention has been described by means of specific examples and in specific embodiments, we do not wish to be limited thereto, for obvious modifications will occur to those skilled in the art without departing from the spirit and scope of the invention.

We claim:

1. In a matrix memory system, an electrical conductor formed in a uniplanar geometric pattern; and a plurality of substantially parallel spaced independent substantially linear electrical conductors positioned in operative proximity with said pattern-formed electrical conductor in a plane perpendicular to that of said pattern-formed electrical conductor, each of said plurality of electrical conductors having a ferromagnetic thin film thereon, said substantially linear conductors being positioned in a matrix form in rows and columns and said electrical conductor being positioned in a manner whereby a magnetic field produced by a current therein and a magnetic field produced by a current in said linear conductors are substantially perpendicular to each other, said electrical conductor being rectilinearly positioned in the spaces between the substantially linear conductors of a plane and providing a magnetic flux to the linear conductors on both sides thereof.

2. In a matrix memory system, a plurality of substantially parallel spaced electrical conductors each formed in a uniplanar geometric pattern; and a plurality of substantially parallel spaced independent groups of substantially linear electrical conductors, each of said groups comprising a plurality of substantially parallel spaced independent substantially linear electrical conductors positioned in operative proximity with said pattern-formed electrical conductors in a plane perpendicular to those of said pattern-formed electrical conductors, each of said plurality of electrical conductors having a ferromagnetic thin film thereon, said substantially linear conductors being positioned in a matrix form in rows and columns and said electrical conductors being positioned in a manner whereby a magnetic field produced by a current in an electrical conductor and a magnetic field produced by a current in said linear condutors are substantially perpendicular to each other, each of said electrical conductors being rectilinearly positioned in the spaces between the substantially linear conductors of a group in a plane and providing a magnetic flux to the linear conductors on both sides thereof.

3. In a matrix memory system, an electrical conductor formed in a uniplanar geometric pattern in which said conductor is folded over upon itself in opposite directions to provide a plurality of substantially parallel spaced linear portions joined at their opposite ends to the next adjacent linear portions; and a plurality of substantially parallel spaced independent substantially linear electrical conductors positioned in operative proximity with said pattern-formed electrical conductor in a plane perpendicular to that of said pattern-formed electrical conductor and between adjacent parallel portions of said pattern-formed electrical conductor, each of said plurality of electrical conductors having a ferromagnetic thin film thereon, said substantially linear conductors being positioned in a matrix form in rows and columns and said electrical conductor being positioned in a manner whereby a magnetic field produced by a current therein and a magnetic field produced by a current in said linear conductors are substantially perpendicular to each other, said electrical conductor being rectilinearly positioned in the spaces between the substantially linear conductors of a plane and providing a magnetic flux to the linear conductors on both sides thereof.

4. In a matrix memory system, a plurality of substantially parallel spaced electrical conductors each formed in a uniplanar geometric pattern in which said conductor is folded over upon itself in opposite directions to provide a plurality of substantially parallel spaced linear portions joined at their opposite ends to the next adjacent linear portions; and a plurality of substantially parallel spaced independent groups of substantially linear electrical conductors, each of said groups comprising a plurality of substantially parallel spaced independent substantially linear electrical conductors positioned in operative proximity with said pattern-formed electrical conductors in a plane perpendicular to those of said pattern-formed electrical conductors and between corresponding adjacent parallel portions of said pattern-formed electrical conductors, each of said plurality of electrical conductors having a ferromagnetic thin film thereon, said substantially linear conductors being positioned in a matrix form in rows and columns and said electrical conductors being positioned in a manner whereby a magnetic field produced by a current in an electrical conductor and a magnetic field produced by a current in said linear conductors are substantially perpendicular to each other, each of said electrical conductors being rectilinearly positioned in the spaces between the substantially linear conductors of a group in a plane and providing a magnetic flux to the linear conductors on both sides thereof.

5. In a matrix memory system, a first electrical conductor formed in a uniplanar geometric pattern in which said first conductor is folded over upon itself in opposite directions to provide a first plurality of substantially parallel spaced linear portions joined at their opposite ends to the next adjacent linear portions; a second electrical conductor formed in a uniplanar geometric pattern parallel and adjacent to said first pattern-formed electrical conductor in which said second conductor is folded over upon itself in opposite directions transverse to those of said first pattern-formed electrical conductor to provide a second plurality of substantially parallel spaced linear portions transverse to those of said first pattern-formed electrical conductor and joined at their opposite ends to the next adjacent linear portions; and a plurality of substantially parallel spaced independent substantially linear electrical conductors positioned in operative proximity with said pattern-formed electrical conductors in a plane perpendicular to those of said first and second pattern-formed electrical conductors and between adjacent parallel portions of each of said first and second pattern-formed electrical conductors, each of said plurality of electrical conductors having a ferromagnetic thin film thereon, said substantially linear conductors being positioned in a matrix form in rows and columns and said electrical conductors being positioned in a manner whereby a magnetic field produced by a current in an electrical conductor and a magnetic field produced by a current in said linear conductors are substantially perpendicular to each other, each of said electrical conductors being rectilinearly positioned in the spaces between the substantially linear conductors of a group in a plane and providing a magnetic flux to the linear conductors on both sides thereof.

6. A matrix memory system as claimed in claim 5, wherein the linear portions of said first and second pattern-formed electrical conductors are perpendicular to each other.

7. In a matrix memory system, a plurality of substantially parallel spaced first electrical conductors each formed in a uniplanar geometric pattern in which said first conductor is folded over upon itself in opposite directions to provide a first plurality of substantially parallel spaced linear portions joined at their opposite ends to the next adjacent linear portions; a plurality of substantially parallel spaced second electrical conductors each formed in a uniplanar geometric pattern parallel and adjacent to a corresponding one of said first pattern-formed electrical conductors in which said second conductor is folded over upon itself in opposite directions transverse to those of said first pattern-formed electrical conductors to provide a second plurality of substantially parallel spaced linear portions transverse to those of said first pattern-formed electrical conductors and joined at their opposite ends to the next adjacent linear portions; and a plurality of substantially parallel spaced independent groups of substantially linear electrical conductors, each of said groups comprising a plurality of substantially parallel spaced independent substantially linear electrical conductors positioned in operative proximity with said pattern-formed electrical conductors in a plane perpendicular to those of said first and second pattern-formed electrical conductors and between corresponding adjacent parallel portions of each of said first and second pattern-formed electrical conductors, each of said plurality of electrical conductors having a ferromagnetic thin film thereon, said substantially linear conductors being positioned in a matrix form in rows and columns and said electrical conductors being positioned in a manner whereby a magnetic field produced by a current in an electrical conductor and a magnetic field produced by a current in said linear conductors are substantially perpendicular to each other, each of said electrical conductors being rectilinearly positioned in the spaces between the substantially linear conductors of a group in a plane and providing a magnetic flux to the linear conductors on both sides thereof.

8. A matrix memory system as claimed in claim 7, wherein the linear portions of said first and second pattern-formed electrical conductors are perpendicular to each other.

9. In a matrix memory system, a first electrical conductor formed in a uniplanar geometric pattern in which said first conductor is folded over upon itself in opposite directions to provide a first plurality of substantially parallel spaced linear portions joined at their opposite ends to the next adjacent linear portions; a second electrical conductor formed in a uniplanar geometric pattern parallel and adjacent to said first pattern-formed electrical conductor in which said second conductor is folded over upon itself in opposite directions transverse to those of said first pattern-formed electrical conductor to provide a second plurality of substantially parallel spaced linear portions transverse to those of said first pattern-formed electrical conductor and joined at their opposite ends to the next adjacent linear portions; a third electrical conductor formed in a uniplanar geometric pattern parallel and adjacent to said first and second pattern-formed electrical conductors in which said third conductor is folded over upon itself in opposite directions transverse to those of said first and second pattern-formed electrical conductors to provide a third plurality of substantially parallel spaced linear portions transverse to those of said first and second pattern-formed electrical conductors and joined at their opopsite ends to the next adjacent linear portions; and a plurality of substantially parallel spaced independent substantially linear electrical conductors positioned in operative proximity with said pattern-formed electrical conductors in a plane perpendicular to those of said first, second and third pattern-formed electrical conductors and between adjacent parallel portions of each of said first, second and third pattern-formed electrical conductors, each of said plurality of electrical conductors having a ferromagnetic thin film thereon.

10. A matrix memory system as claimed in claim 9, wherein the linear portions of said first, second and third pattern-formed electrical conductors are disposed at angles of 60 degrees with each other and form equilateral triangles between them.

11. In a matrix memory system, a plurality of substantially parallel spaced first electrical conductors each formed in a uniplanar geometric pattern in which said first conductor is folded over upon itself in opposite directions to provide a first plurality of substantially parallel spaced linear portions joined at their opposite ends to the next adjacent linear portions; a plurality of substantially parallel spaced second electrical conductors each formed in a uniplanar geometric pattern parallel and adjacent to a corresponding one of said first pattern-formed electrical conductors in which said second conductor is folded over upon itself in opposite directions transverse to those of said first pattern-formed electrical conductors to provide a second plurality of substantially parallel spaced linear portions transverse to those of said first pattern-formed electrical conductors and joined at their opposite ends to the next adjacent linear portions; a plurality of substantially parallel spaced third electrical conductors each formed in a uniplanar geometric pattern parallel and adjacent to a corresponding one of said first and to a corresponding one of said second pattern-formed electrical conductors in which said third conductor is folded over upon itself in opposite directions transverse to those of said first and second pattern-formed electrical conductors to provide a third plurality of substantially parallel spaced linear portions transverse to those of said first and second pattern-formed electrical conductors and joined at their opposite ends to the next adjacent linear portions; and a plurality of substantially parallel spaced independent groups of substantially linear electrical conductors, each of said groups comprising a plurality of substantially parallel spaced independent substantially linear electrical conductor positioned in operative proximity with said pattern-formed electrical conductors in a plane perpendicular to those of said first, second and third pattern-formed electrical conductors and between corresponding adjacent parallel portions of each of said first, second and third pattern-formed electrical conductors, each of said plurality of electrical conductors having a ferromagnetic thin film thereon.

12. A matrix memory system as claimed in claim 11, wherein the linear portions of said first, second and third pattern-formed electrical conductors are disposed at angles of 60 degrees with each other and form equilateral triangles between them.

13. In a matrix memory system, a plurality of electrical conductors formed in a uniplanar triangular pattern; and a plurality of substantially parallel spaced independent substantially linear electrical conductors positioned in operatively proximity with said pattern-formed electrical conductors in a plane perpendicular to that of said pattern-formed electrical conductors, each of said plurality of electrical conductors having a ferromagnetic thin film thereon.

14. In a matrix memory system, a plurality of electrical conductors formed in a uniplanar equilateral triangular pattern; and a plurality of substantially parallel spaced independent substantially linear electrical conductors positioned in opertive proximity with said pattern-formed electrical conductors in a plane perpendicular to that of said pattern-formed electrical conductors, each of said plurality of electrical conductors having a ferromagnetic thin film thereon.

15. In a matrix memory system, a first plurality of substantially parallel spaced independent substantially linear electrical conductors in a first plane; a second plurality of substantially parallel spaced independent substantially linear electrical conductors in a second plane parallel and adjacent to said first plane and positioned at an angle of 60 degrees with said first conductors; a third plurality of substantially parallel spaced independent substantially linear electrical conductors in a third plane parallel and adjacent to said first and second planes and positioned at an angle of 60 degrees with each of said first and second conductors to form equilateral triangles with said first and second conductors; and a plurality of substantially parallel spaced independent substantially linear electrical conductors positioned in operative proximity with said pattern-formed electrical conductors in corresponding ones of the triangles formed thereby in a plane perpendicular to those of said first, second and third conductors, each of said plurality of electrical conductors having a ferromagnetic thin film thereon.

16. In a matrix memory system, a first plurality of independent groups of electrical conductors each comprising a first plurality of substantially parallel spaced independent substantially linear electrical conductors in a first plane, said first planes of said first groups of conductors being substantially parallel to and spaced from each other; a second plurality of independent groups of electrical conductors each comprising a second plurality of substantially parallel spaced independent substantially linear electrical conductors in a second plane adjacent to a corresponding one of said first planes and positioned at an angle of 60 degrees with said first conductors, said second planes of said second groups of conductors being substantially parallel to and spaced from each other; a third plurality of independent groups of electrical conductors each comprising a third plurality of substantially parallel spaced independent substantially linear electrical conductors in a third plane adjacent to a corresponding one of each of said first and second planes and positioned at an angle of 60 degrees with said first and second conductors to form equilateral triangles with said first and second conductors, said third planes of said third groups of conductors being substantially parallel to and spaced from each other; and a plurality of substantially parallel spaced independent groups of substantially linear electrical conductors, each of said groups comprising a plurality of substantially parallel spaced independent substantially linear electrical conductors positioned in operative proximity with said pattern-formed electrical conductors in corresponding ones of the triangles formed thereby in a plane perpendicular to those of said first, second and third conductors, each of said plurality of electrical conductors having a ferromagnetic thin film thereon.

References Cited

UNITED STATES PATENTS

| | | | |
|---|---|---|---|
| 3,371,326 | 2/1968 | Fedde | 340—174 |
| 3,130,134 | 4/1964 | Jones | 340—174 |
| 3,134,965 | 5/1964 | Meier | 340—174 |
| 3,238,516 | 3/1966 | Hore | 340—174 |
| 3,264,713 | 8/1966 | Viehe | 340—174 |
| 3,295,115 | 12/1966 | Snyder | 340—174 |
| 3,328,781 | 6/1967 | Robey | 340—174 |

TERRELL W. FEARS, Primary Examiner